(No Model.)
A. E. NEWMAN.
PROCESS OF OBTAINING FIBER FROM FIBER PRODUCING PLANTS.
No. 345,984. Patented July 20, 1886.
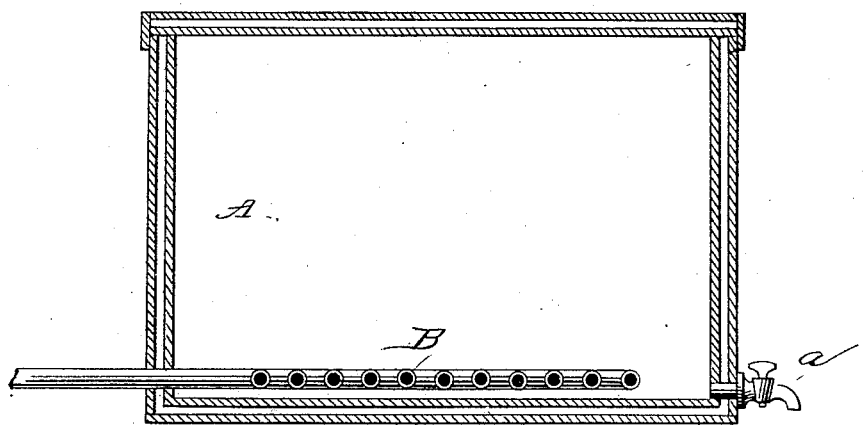
Attest
Walter Donaldson
F. L. Middleton
Inventor
Anton E. Newman
by Joyce & Spear
Attys.

UNITED STATES PATENT OFFICE.

ANTON E. NEWMAN, OF NEW YORK, N. Y., ASSIGNOR OF ONE-HALF TO LOUIS BECKHARDT, OF SAME PLACE.

PROCESS OF OBTAINING FIBER FROM FIBER-PRODUCING PLANTS.

SPECIFICATION forming part of Letters Patent No. 345,984, dated July 20, 1886.

Application filed November 14, 1885. Serial No. 182,806. (No specimens.)

*To all whom it may concern:*

Be it known that I, ANTON E. NEWMAN, of New York, in the county of New York and State of New York, have invented a new and useful Improvement in Process of Obtaining Fiber from Fiber-Producing Plants; and I do hereby declare that the following is a full, clear, and exact description of the same.

My invention is an improved process for obtaining fiber from fiber-producing plants—such as nettles, jute, hemp, flax, laporte, ramie, urtica utilis, urtica dioica, and the like.

The special object of the invention is to produce a fibrous material resembling in some of its forms ordinary wool, and which I have therefore named "Wooline," said material being designed to be used alone or in mixture with ordinary wool or other animal fibers in the manufacture of all kinds of fabrics.

My object, also, is to provide a process at the same time simple and inexpensive and requiring few ingredients, and only machinery that may be carried to any place where the plants can be found from which such material may be produced.

The only apparatus required in carrying on my process is a wooden air and water tight tank or tub with an air-tight cover and heating apparatus. I prefer to make the walls of the tank and its cover or bottom double, with intermediate air-spaces, the better to retain the heat. In the bottom is a faucet for drawing off the water or spent materials, and a worm for heating is placed in the bottom with necessary steam-connections.

Such a tank is shown in the figure of the accompanying drawing in central vertical section in which A represents the tank; B, the heating-coil, and *a* the drawing-off faucet.

In the following explanation of my process I assume this tank to be one and one-half meter in length, one meter wide, and one meter high. I cut the plants, wherever suitable may be found, and preferably treat them in a green state. I tie them ordinarily in small bundles, and place about one hundred pounds of such plants in the tank, which is previously cleaned thoroughly. The tank is three-fourths filled with clear water, and in this I dissolve one and a half pounds of potassium de russie (Russian potash) and one pound of lime. In this solution and in the closed tank I boil the plants for about two hours at a heat of 95° Reaumur, more or less. After this boiling I take the plants from the tank and place them in the breaker or scraping machine—such as are commonly used for the purpose—and break them until the woody covering peels off and all the hard and woody portions are thoroughly removed from the fiber. This leaves the fibers in their grayish natural color, and they may then be bleached, if desired, in any well-known way.

I am aware that it is not new to subject crude fiber-producing material to the boiling process at a high heat, and afterward treat them with a caustic alkali, and also that such materials have been subjected to heat in a solution of caustic alkali. I am also aware that cane has been softened by boiling in lime-water with a proportion of potash or soda mixed therewith, and I do not broadly claim this process, which is shown in the patent of Smith, No. 3,349, of 1843. My process is limited to the precise ingredients specified and to substantially the length of time and heat of boiling, and this process, while not adapted to reduce such natural product as cane, it is adapted to treatment of the kind of plants specified, and I have found it to be the process exactly suited to reduce the plants to a proper fibrous condition to remove the gummy matters, and to leave them in a condition in which they can be put in a breaking and scraping machine.

I claim as my invention—

The process for treating the described kind of plants, the same consisting in boiling the plants in a closed vessel at a temperature of about 95° Reaumur for two hours (more or less) in a solution of Russian potash and lime, in the proportions of one and one-half pounds of potash to one pound of lime, substantially as described.

In testimony whereof I have signed my name to this specification in the presence of two subscribing witnesses.

ANTON E. NEWMAN.

Witnesses:
F. L. MIDDLETON,
CHAS. L. STURTEVANT.